H. W. REYNOLDS.
DOUBLE FLAP CHECK VALVE.
APPLICATION FILED MAY 28, 1913.
1,087,981.
Patented Feb. 24, 1914.
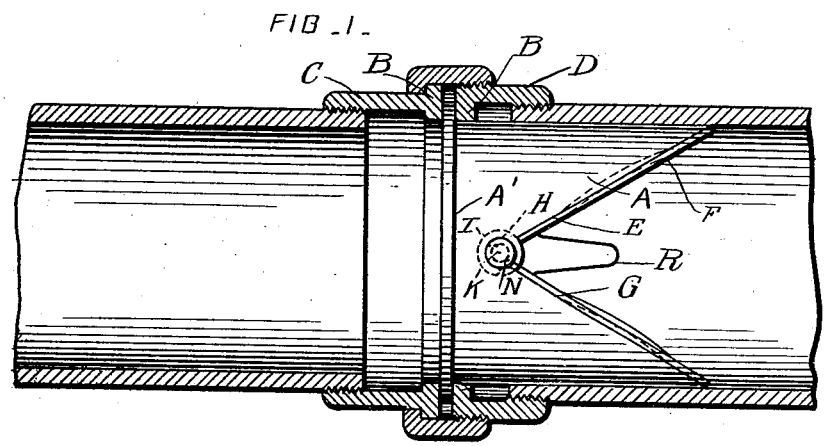
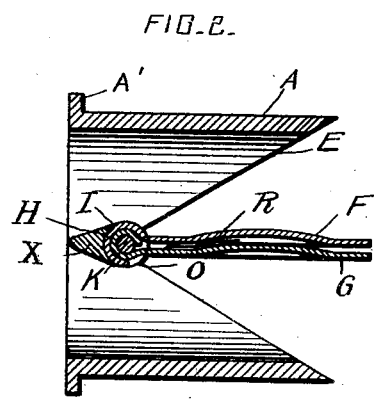
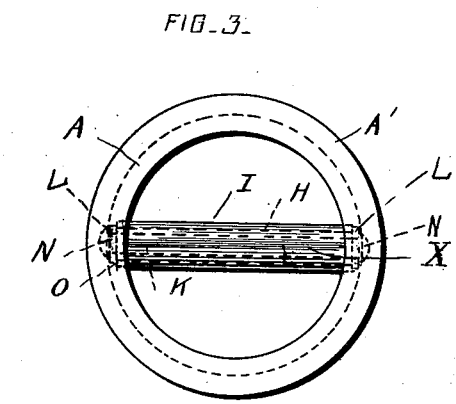
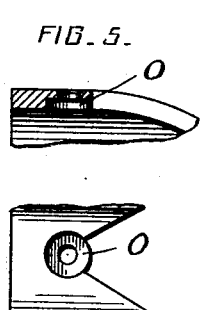
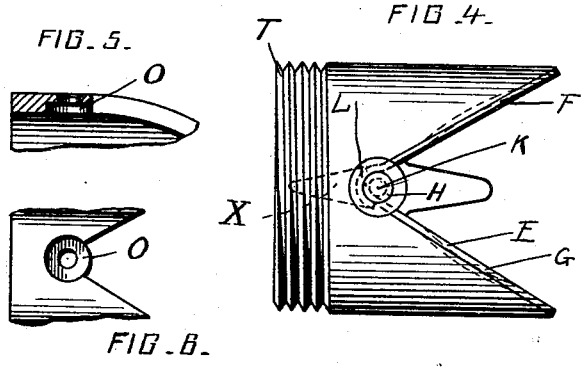
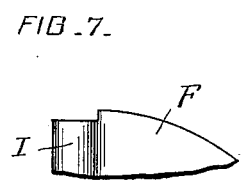
Inventor
H. W. Reynolds

UNITED STATES PATENT OFFICE.

HOWARD W. REYNOLDS, OF CHICAGO, ILLINOIS.

DOUBLE FLAP CHECK-VALVE.

1,087,981.  Specification of Letters Patent.  Patented Feb. 24, 1914.

Application filed May 28, 1913. Serial No. 770,436.

*To all whom it may concern:*

Be it known that I, HOWARD W. REYNOLDS, a citizen of the United States, residing at Chicago, in the county of Cook and State of Illinois, have invented certain new and useful Improvements in Double Flap Check-Valves; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in flap check valves for use in line pipes, water meters, etc., and comprises a simple and efficient device of this nature having various details of construction and combinations and arrangements of parts which will be hereinafter fully described, shown in the accompanying drawings and then specifically defined in the appended claim.

I illustrate my invention in the accompanying drawings, in which:—

Figure 1 is a central longitudinal sectional view through a valve made in accordance with my invention and held within the joints of a union of a main. Fig. 2 is a sectional view through the check valve showing the valves open. Fig. 3 is an end view. Fig. 4 is a sectional view showing the valve mounted in a casing having threaded end for attachment to a water meter. Fig. 5 is a detail, partially in section. Fig. 6 is a side elevation of a part of a shell, and Fig. 7 is a detail in elevation of a part of the invention.

Reference now being had to the details of the drawings by letter, A designates the valve casing which, in the form shown in Fig. 1, is provided with a flange A' at one end and adapted to be clamped between the flanges B of the coupling members C and D. Said shell has a V-shaped recess E formed in one end, forming inclined seats for the two flap valves F and G, which are preferably concaved. Said valve G has its inner end bent into a cylindrical roll H adapted to receive the pivotal pin K and the other valve has its inner end bent to form a concaved hook I engaging about the roll in the manner shown in the sectional view of the drawings.

Washers L are countersunken in recesses in the wall of the valve shell with their outer faces flush with the outer surface thereof and against which washers the upset ends or heads N of the pin contact, thus securely holding the valves in place. Each valve seat has a cut away or recessed portion O along its marginal edge to allow the valve to move about said washers. A spring R has one end engaging the valve F and the other the wing G and tends to normally hold the same seated against the inclined marginal edges of the V-shaped portion of the shell. When the valves are in wide open positions, their outer faces are in contact with each other, the concaved portions of the valves allowing space to receive the spring, while valves made in this particular way will be reinforced and made more rigid by being shaped as shown in the drawings.

Projecting from the hinge is a conical shape rib X which serves as a support for the valve seat and extends the entire width of the shell, thereby reinforcing the same.

In Fig. 4 of the drawings, I have shown a slight modification in the shape of the valve casing in which one end T is threaded and adapted to engage a water meter when the valve is used in connection therewith, otherwise the construction of the valve is identical with that before shown and described.

By the provision of a double flap valve made in accordance with my invention, it will be noted that a practically water tight joint is afforded by the central hinged portion and so arranged that the greater the back pressure upon the valve the tighter they will be held in their seats, while the valves will be allowed to unseat against the tension of the spring by a pressure from the opposite direction.

What I claim to be new is:—

A double flap check valve for water mains, meters, etc., comprising a valve casing having a V-shaped opening in one end thereof, a tapering rib portion extending diametrically across the shell in the interior thereof, a pin mounted within said shell and bearing against said rib, flap valves, one being turned into a cylindrical roll and adapted to receive said pin and the other bent to form a rounded hook portion designed to engage said roll, a spring bearing against the outer faces of the valves and adapted to hold the same seated against the inclined edges of the casing, as set forth.

In testimony whereof I hereunto affix my signature in presence of two witnesses.

HOWARD W. REYNOLDS.

Witnesses:
WM. SHERMAN CARSON,
EDITH C. SCOTT.

Copies of this patent may be obtained for five cents each, by addressing the "Commissioner of Patents, Washington, D. C."